US012766777B2

(12) United States Patent
Maenishi et al.

(10) Patent No.: US 12,766,777 B2
(45) Date of Patent: Oct. 20, 2026

(54) RESIN-FILM MANUFACTURING APPARATUS AND ITS CONTROL METHOD

(71) Applicant: THE JAPAN STEEL WORKS, LTD., Tokyo (JP)

(72) Inventors: Ryuichiro Maenishi, Tokyo (JP); Fumitake Fujii, Yamaguchi (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 108 days.

(21) Appl. No.: 18/433,294

(22) Filed: Feb. 5, 2024

(65) Prior Publication Data

US 2024/0278475 A1 Aug. 22, 2024

(30) Foreign Application Priority Data

Feb. 22, 2023 (JP) ................................ 2023-026009

(51) Int. Cl.
*B29C 48/92* (2019.01)
*B29C 48/08* (2019.01)
(Continued)

(52) U.S. Cl.
CPC .............. *B29C 48/92* (2019.02); *B29C 48/08* (2019.02); *B29C 48/313* (2019.02);
(Continued)

(58) Field of Classification Search
CPC ..... B29C 48/302; B29C 48/31; B29C 48/313; B29C 48/92; B29C 2948/92152;
(Continued)

(56) References Cited

U.S. PATENT DOCUMENTS 3,761,553 A * 9/1973 Richardson ............. B29C 48/86 264/327
4,409,160 A * 10/1983 Kogo ....................... G05D 5/03 425/141
(Continued)

FOREIGN PATENT DOCUMENTS

JP H8-112852 A 5/1996
JP H9-164582 A 6/1997
(Continued)

OTHER PUBLICATIONS

Office Action issued Sep. 8, 2026, in Japanese Patent Application No. 2023-026009.

*Primary Examiner* — Jeffrey M Wollschlager
(74) *Attorney, Agent, or Firm* — Potomac Law Group, PLLC

(57) ABSTRACT

In a resin-film manufacturing apparatus according to an embodiment, when manufacturing of a resin film is started, measurement of a distribution of thicknesses (DOT), and feedback-control of a plurality of heaters for making DOT uniform are repeated a predetermined number of cycles; a measurement point at which DOT having a highest correlation rate with a heating history of a central heat bolt (CHB) among heat bolts in a central part in a width direction of the resin film is defined as a central position in an assignment range assigned to CHB in DOT; and the assignment range is determined from the central position of CHB so that an area ratio of a gap region assigned to CHB to a whole lip gap becomes equal to a ratio of a cross-sectional area of the resin film in the assignment range to a total cross-sectional area of the resin film.

15 Claims, 10 Drawing Sheets

(51) Int. Cl.
*B29C 48/31* (2019.01)
*B29C 48/88* (2019.01)

(52) U.S. Cl.
CPC .. *B29C 48/914* (2019.02); *B29C 2948/92152* (2019.02); *B29C 2948/92447* (2019.02); *B29C 2948/92647* (2019.02); *B29C 2948/92704* (2019.02); *B29C 2948/92904* (2019.02)

(58) Field of Classification Search
CPC ........... B29C 2948/92409; B29C 2948/92647; B29C 2946/92904
See application file for complete search history.

(56) References Cited

U.S. PATENT DOCUMENTS

| | | | | | |
|---|---|---|---|---|---|
| 4,514,348 | A * | 4/1985 | Iguchi | D21F 1/028 | 264/408 |
| 4,765,941 | A * | 8/1988 | Anthony, Jr. | B29C 48/92 | 425/141 |
| 4,804,556 | A * | 2/1989 | Leffew | G05D 5/03 | 425/141 |
| 4,931,982 | A * | 6/1990 | Hayashida | G05D 5/03 | 425/141 |
| 5,229,140 | A * | 7/1993 | Crass | B29C 48/865 | 425/141 |
| 5,928,580 | A | 7/1999 | Nitta et al. | | |
| 2002/0175434 | A1 | 11/2002 | Uehara et al. | | |
| 2003/0050717 | A1* | 3/2003 | Hirata | B29C 55/12 | 264/239 |
| 2009/0045536 | A1* | 2/2009 | Terao | B29C 48/91 | 425/4 R |
| 2012/0247212 | A1* | 10/2012 | Knorr | B29C 48/92 | 73/632 |
| 2016/0193774 | A1* | 7/2016 | Martena | B29C 48/0023 | 425/141 |
| 2020/0290259 | A1* | 9/2020 | Maenishi | B29C 48/313 | |
| 2021/0114275 | A1* | 4/2021 | Moeller | B29C 48/92 | |
| 2021/0402667 | A1* | 12/2021 | Colell | B29C 48/305 | |
| 2021/0402670 | A1* | 12/2021 | Colell | B29C 48/92 | |
| 2022/0111574 | A1* | 4/2022 | Schmitz | B29C 48/2692 | |
| 2023/0249390 | A1* | 8/2023 | Lohia | B29C 48/313 | 264/40.1 |

FOREIGN PATENT DOCUMENTS

| | | |
|---|---|---|
| JP | 2002-301752 A | 10/2002 |
| JP | 2004-122435 A | 4/2004 |
| JP | 2020-152097 A | 9/2020 |

* cited by examiner

RESIN-FILM MANUFACTURING APPARATUS AND ITS CONTROL METHOD

INCORPORATION BY REFERENCE

This application is based upon and claims the benefit of priority from Japanese patent application No. 2023-026009, filed on Feb. 22, 2023, the disclosure of which is incorporated herein in its entirety by reference.

BACKGROUND

The present disclosure relates to a resin-film manufacturing apparatus and its control method.

As disclosed in Japanese Unexamined Patent Application Publication No. 2020-152097, the inventors of the present disclosure have developed a resin-film manufacturing apparatus in which a film-like molten resin is extruded from a gap between lips (hereinafter also referred to as a lip gap) of a die connected to an extruder, and its control method. In such a resin-film manufacturing apparatus, it is necessary to make the distribution of thicknesses of a resin film to be manufactured in the width direction thereof uniform.

Therefore, as disclosed in Japanese Unexamined Patent Application Publication No. 2020-152097, a plurality of heat bolts arranged along the longitudinal direction of the lip (i.e., a direction corresponding to the width direction of the resin film) are provided in the die of the resin-film manufacturing apparatus. The distribution of thicknesses of the resin film in the width direction thereof is measured, and the amount of thermal expansion caused by a heater of each heat bolt is individually feedback-controlled so that the distribution of thicknesses is made uniform. That is, the lip gap of the die is locally feedback-controlled so that the distribution of thicknesses is made uniform.

SUMMARY

The inventors of the present disclosure have found the following problem in the development of a resin-film manufacturing apparatus including a die including a plurality of heat bolts, in which the amount of thermal expansion caused by a heater of each heat bolt can be individually feedback-controlled.

In order to individually feedback-control the heater of each heat bolt, it is necessary to determine a range assigned to each heat bolt in the distribution of thicknesses of a resin film to be measured (i.e., a range in which a corresponding heat bolt has a dominant effect). Since this range varies depending on the type of resin film, manufacturing conditions, and the like, it is necessary to determine this range every time the manufacturing of a resin film is started. The method for determining such a range that the inventors of the present disclosure have adopted in the past requires a long time and wastes a large amount of resin material.

Other problems and novel features will be clarified from the descriptions in this specification and the attached drawings.

In a resin-film manufacturing apparatus according to an embodiment, when manufacturing of a resin film is started, measurement of a distribution of thicknesses, and feedback-control of a plurality of heaters for making the distribution of thicknesses uniform are repeated a predetermined number of cycles, a measurement point at which the distribution of thicknesses having a highest correlation rate with a heating history of a central heat bolt among a plurality of heat bolts in a central part in a width direction of the resin film is defined as a central position in an assignment range assigned to the central heat bolt in the distribution of thicknesses, and the assignment range is determined from the central position of the central heat bolt so that an area ratio of a gap region assigned to the central heat bolt to a whole lip gap becomes equal to a ratio of a cross-sectional area of the resin film in the assignment range to a total cross-sectional area of the resin film.

According to the embodiment, it is possible to provide an excellent resin-film manufacturing apparatus.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments will be described hereinafter in detail with reference to the drawings. However, the present disclosure is not limited to the below-shown embodiments. Further, the following descriptions and the drawings are simplified as appropriate for clarifying the explanation.

First Embodiment

<Overall Configuration of Resin-Film Manufacturing Apparatus and Resin-Film Manufacturing Method>

Figure 1:
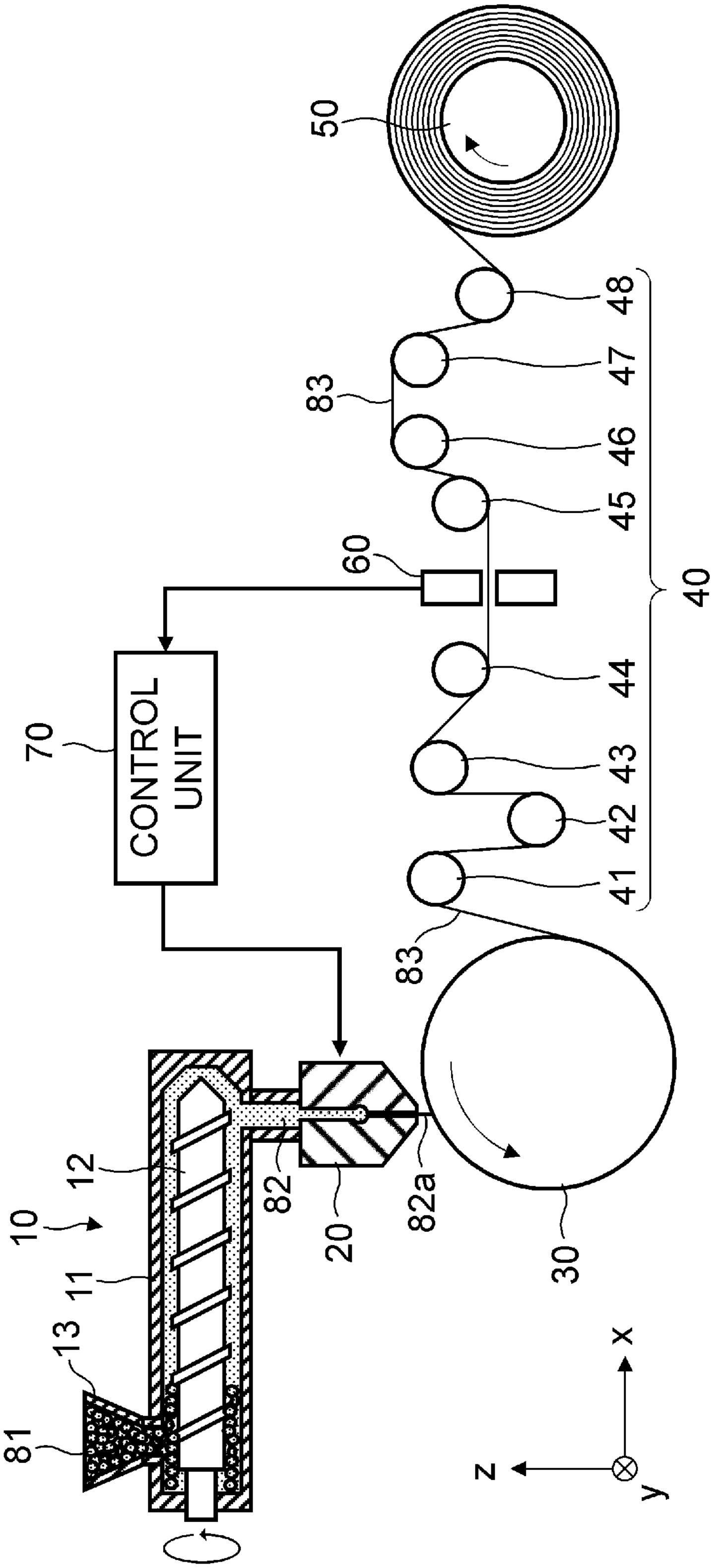
FIG. 1 is a schematic cross-sectional view showing an overall configuration of a resin-film manufacturing apparatus and a resin-film manufacturing method according to a first embodiment.

Firstly, the overall configuration of a resin-film manufacturing apparatus and a resin-film manufacturing method according to a first embodiment will be described with reference to FIG. 1. FIG. 1 is a schematic cross-sectional view showing the overall configuration of the resin-film manufacturing apparatus and the resin-film manufacturing method according to the first embodiment.

Note that, needless to say, right-handed xyz-orthogonal coordinates shown in FIG. 1 and other drawings are shown for the sake of convenience for explaining the positional relation among components. In general, the z-axis positive direction is the vertically upward direction and the xy-plane is a horizontal plane throughout the drawings.

Further, in this specification, the term "resin film" includes a resin sheet.

As shown in FIG. 1, the resin-film manufacturing apparatus according to the first embodiment includes an extruder 10, a T-die 20, a cooling roll 30, a group of conveyor rolls (hereinafter also referred to as a conveyor roll group) 40, a winder 50, a thickness sensor 60, and a control unit 70. The resin-film manufacturing apparatus according to the first embodiment is an extrusion-molding type resin-film manufacturing apparatus in which a film-like molten resin 82*a* is extruded from a lip gap (i.e., a gap between lips) of the T-die 20 connected to the extruder 10.

The extruder 10 is, for example, a screw-type extruder. In the extruder 10 shown in FIG. 1, a screw 12 extending in the x-axis direction is housed in a cylinder 11 extending in the x-axis direction. A hopper 13 for charging resin pellets 81, which are a raw material for a resin film 83, is provided over the upper side of the cylinder 11 near the end thereof located on the negative side in the x-axis direction.

The resin pellets 81 supplied from the hopper 13 are extruded (i.e., pushed) from the base of the rotating screw 12 toward the tip thereof, i.e., extruded (i.e., pushed) in the x-axis positive direction. The resin pellets 81 are compressed by the screw 12, which is rotating inside the cylinder 11, and are transformed into molten resin 82.

Note that although it is not shown in the drawings, for example, a motor is connected, as a driving source, to the screw 12 through a speed reducer.

As shown in FIG. 1, the T-die 20 is connected to the lower side of the extruder 10 near the distal end thereof (the end on the positive side in the x-axis direction). The film-like molten resin 82*a* is extruded downward (in the z-axis negative direction) from the lip gap of the T-die 20 located at the lower end thereof. Note that the lip gap of the T-die 20 is adjustable. As will be described later in detail, the lip gap of the T-die 20 can be adjusted at a plurality of places along the longitudinal direction of the lips (in the y-axis direction) so that the thickness of the manufactured resin film 83 becomes uniform in the width direction thereof (in the y-axis direction).

The cooling roll 30 discharges the resin film 83, which is formed as the film-like molten resin 82*a* solidifies, while cooling the film-like molten resin 82*a* extruded from the T-die 20. The resin film 83 discharged from the cooling roll 30 is conveyed through the conveyor roll group 40 and is wound up by the winder 50. In the example shown in FIG. 1, the conveyor roll group 40 includes eight conveyor rolls 41 to 48. The number and arrangement of conveyor rolls are determined as desired.

The thickness sensor 60 is, for example, a noncontact-type thickness sensor and measures the distribution of thicknesses (hereinafter also referred to as the thickness distribution) of the resin film 83, which was discharged from the cooling roll 30 and is being conveyed, in the width direction thereof. In the example shown in FIG. 1, the thickness sensor 60 is disposed so as to vertically sandwich the resin film 83, which is being conveyed in the horizontal direction, between the conveyor rolls 44 and 45. Since the thickness sensor 60 is a noncontact-type sensor, it can be scanned (i.e., moved) in the width direction of the resin film 83 (in the y-axis direction). Therefore, it is possible to measure the thickness distribution of the resin film 83 in the width direction thereof by using a compact thickness sensor 60. Further, since the resin film 83 is conveyed in the horizontal direction, the thickness distribution can be accurately measured even when the thickness sensor 60 is scanned (i.e., moved).

As shown in FIG. 1, when the resin film 83 is manufactured, the control unit 70 feedback-controls the lip gap of the T-die 20 based on the distribution of thicknesses of the resin film 83 acquired from the thickness sensor 60.

More specifically, the control unit 70 individually feedback-controls the heater 24 of each of the heat bolts HB in the T-die 20 shown in FIGS. 2 and 3 (which will be described later) so that the distribution of thicknesses of the resin film 83 is made uniform. When doing so, the control unit 70 learns the control condition of the heater 24.

Note that in order to individually feedback-control the heater 24 of each heat bolt HB shown in FIGS. 2 and 3 (which will be described later), it is necessary to determine a range assigned to each heat bolt HB (hereinafter referred to as an assignment range) in the distribution of thicknesses of the resin film 83 which is measured by the thickness sensor 60.

Therefore, when the manufacturing of the resin film 83 is started, the control unit 70 measures the distribution of thicknesses and repeats the feedback-control of each heat bolt HB (i.e., each heater 24) for making the distribution of thicknesses uniform a predetermined number of cycles. After that, while the resin film 83 is continuously manufactured, the assignment range of each heat bolt HB in the distribution of thicknesses of the resin film 83 is determined.

Note that a more detailed configuration of the control unit 70 and operations thereof (i.e., feedback-control and learning, and the determination of the assignment range of each heat bolt in the distribution of thicknesses) will be described later.

<Configuration of T-Die 20>

The structure of the T-die 20 will be described hereinafter in a more detailed manner with reference to FIGS. 2 and 3. FIG. 2 is a cross-sectional view of the T-die 20. Further, FIG. 3 is a partial perspective view of the lower side (the lip side) of the T-die 20.

Figure 2:
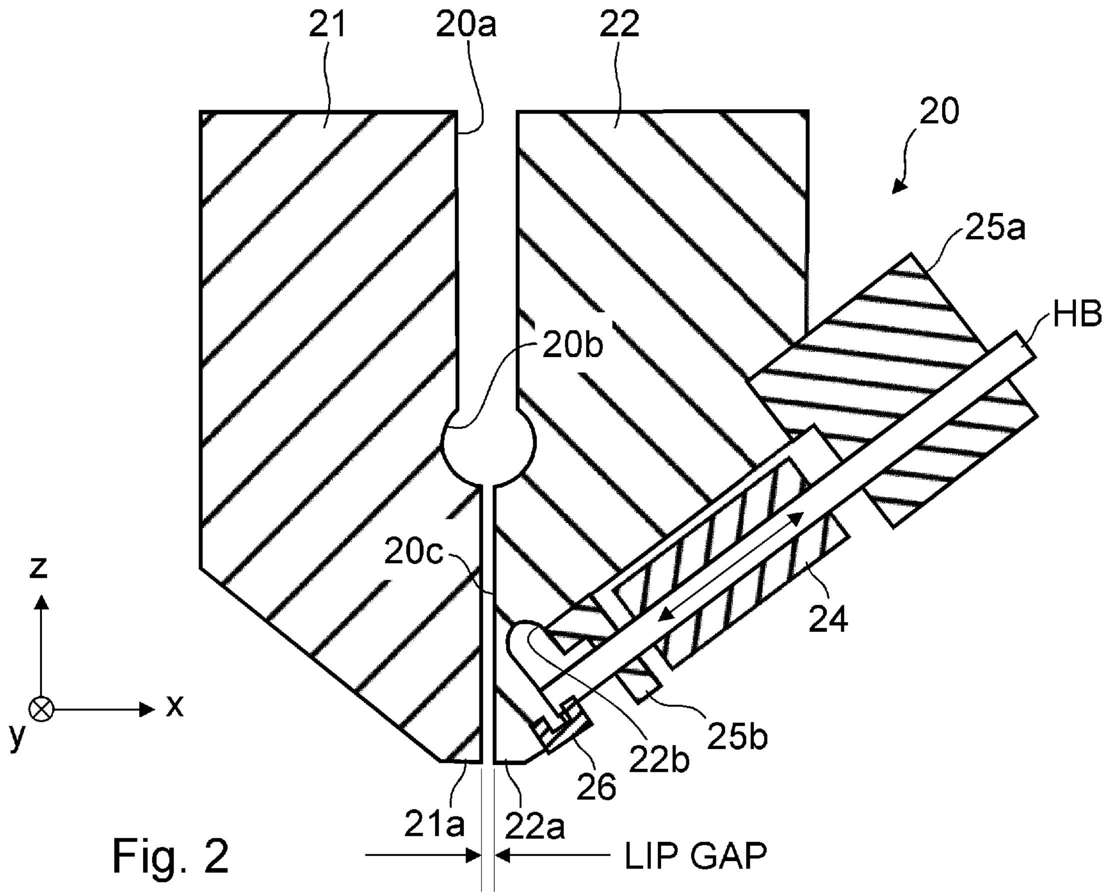
FIG. 2 is a cross-sectional view of a T-die 20.
Figure 3:
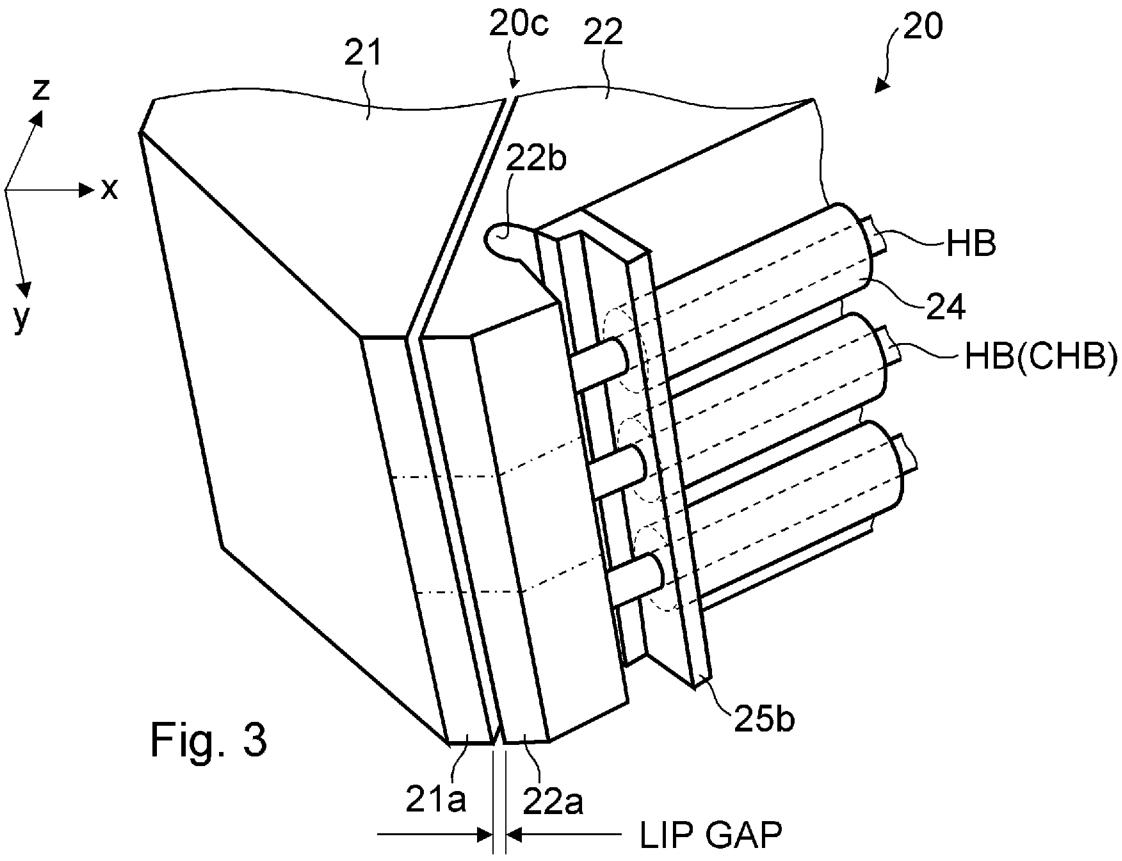
FIG. 3 is a partial perspective view of a lower part (on a lip side) of the T-die 20.

As shown in FIGS. 2 and 3, the T-die 20 is composed of a pair of die blocks 21 and 22 that are arranged so as to abut against each other. In each of the pair of die blocks 21 and 22, which are arranged so as to abut against each other, a tapered part that is inclined downward from the outer-side surface toward the inner-side surface (the abutting surface) is formed. That is, thin lips 21*a* and 22*a* are provided at the lower ends of the abutting surfaces of the die blocks 21 and 22, respectively.

As shown in FIG. 2, an inlet port 20*a*, a manifold 20*b*, and a slit 20*c* are formed in the abutting surfaces of the pair of die blocks 21 and 22. The inlet port 20*a* extends downward (in the z-axis negative direction) from the upper surface of the T-die 20. The manifold 20*b* extends from the lower end of the inlet port 20*a* in the y-axis positive direction and the y-axis negative direction. In this way, the inlet port 20*a* and the manifold 20*b* are formed in a T-shape in the T-die 20.

Further, as shown in FIG. 2, the slit 20*c* extending from the bottom surface of the manifold 20*b* to the lower surface of the T-die 20 extends in the y-axis direction. The molten resin 82 is extruded downward from the slit 20*c* (i.e., from the lip gap, i.e., the gap between the lips 21*a* and 22*a*) through the inlet port 20*a* and the manifold 20*b*.

As shown in FIG. 2, while the lip 21*a* is a fixed stationary lip, the lip 22*a* is a movable lip connected to heat bolts HB.

In the lip 22*a*, a cut-out groove 22*b* is formed so as to extend obliquely upward from the outer-side surface toward the abutting surface. The lip 22*a* is pushed and pulled by the heat bolts HB, so that the lip 22*a* can be moved by using the bottom of the cut-out groove 22*b* as a fulcrum. As described above, only the lip 22*a* is formed as a movable lip, so that the lip gap can be easily adjusted by a simple structure.

As shown in FIG. 2, the heat bolts HB extend obliquely upward along the tapered part of the die block 22. The heat bolts HB are supported by holders 25*a* and 25*b* fixed to the die block 22. More specifically, the heat bolts HB are screwed into threaded holes formed in the holder 25*a*. The tightness of each of the heat bolts HB can be adjusted as desired. In contrast, although the heat bolts HB are inserted through through-holes formed in the holder 25*b*, they are not fixed to the holder 25*b*. Note that the holders 25*a* and 25*b* do not necessarily have to be formed as components that are provided separately from the die block 22. That is, they may be integrally formed with the die block 22.

Note that as shown in FIG. 3, a plurality of heat bolts HB are arranged in a row along the longitudinal direction of the lips 21*a* and 22*a* (in the y-axis direction). The longitudinal direction of the lips 21*a* and 22*a* corresponds to (i.e., substantially parallel to) the width direction of the resin film. Although only three heat bolts HB are provided in the example shown in FIG. 3 for simplifying the drawing, the number of heat bolts HB provided in the die block is usually larger than three.

Note that the heat bolt CH located at the center is distinguished from the other heat bolts and referred to as the central heat bolt CHB for the sake of explanation.

Note that the number of heat bolts HB is usually an odd number, but may be an even number. In this case, the central heat bolt CHB may be one of the two central heat bolts. Although the heat bolts HB are evenly spaced in FIG. 3, they may not be evenly spaced.

One heater 24 is provided for each heat bolt HB to heat that heat bolt HB. In the example shown in FIGS. 2 and 3, for each heat bolt HB, a heater 24 is provided so as to cover the outer peripheral surface of that heat bolt HB between the holders 25*a* and 25*b*. It is possible, by tightening (i.e., screwing) the heat bolts HB, to push the lip 22*a* with the lower end surfaces of the heat bolts HB. Further, the lower ends of the heat bolts HB are connected to the lip 22*a* by a connecting member 26 which has a U-shape in cross section and is fixed to the lip 22*a*. Therefore, by loosening (i.e., unscrewing) the heat bolts HB, the lip 22*a* can be pulled through the connecting member 26.

The lip gap can be adjusted by adjusting the tightness of each of the heat bolts HB. Specifically, when the tightening of the heat bolts HB is increased, the heat bolts HB push the lip 22*a*, so that the lip gap is reduced. On the other hand, when the tightening of the heat bolts HB is reduced, the lip gap is increased. For example, the tightness of the heat bolts HB is manually adjusted.

Further, it is possible to finely adjust the lip gap by the amounts of the thermal expansion (hereinafter also referred to as the thermal expansion amounts) of the heat bolts HB caused by the heaters 24. Specifically, when the heating temperatures of the heaters 24 are raised, the thermal expansion amounts of the heat bolts HB increase, so that the heat bolts HB push the lip 22*a* and the lip gap is thereby reduced. On the other hand, when the heating temperatures of the heaters 24 are lowered, the thermal expansion amounts of the heat bolts HB decrease, so that the lip gap is increased. The thermal expansion amount of each heat bolt HB, i.e., the heating by each heater 24 is controlled by the control unit 70.

<Configuration of Control Unit 70>

Figure 4:
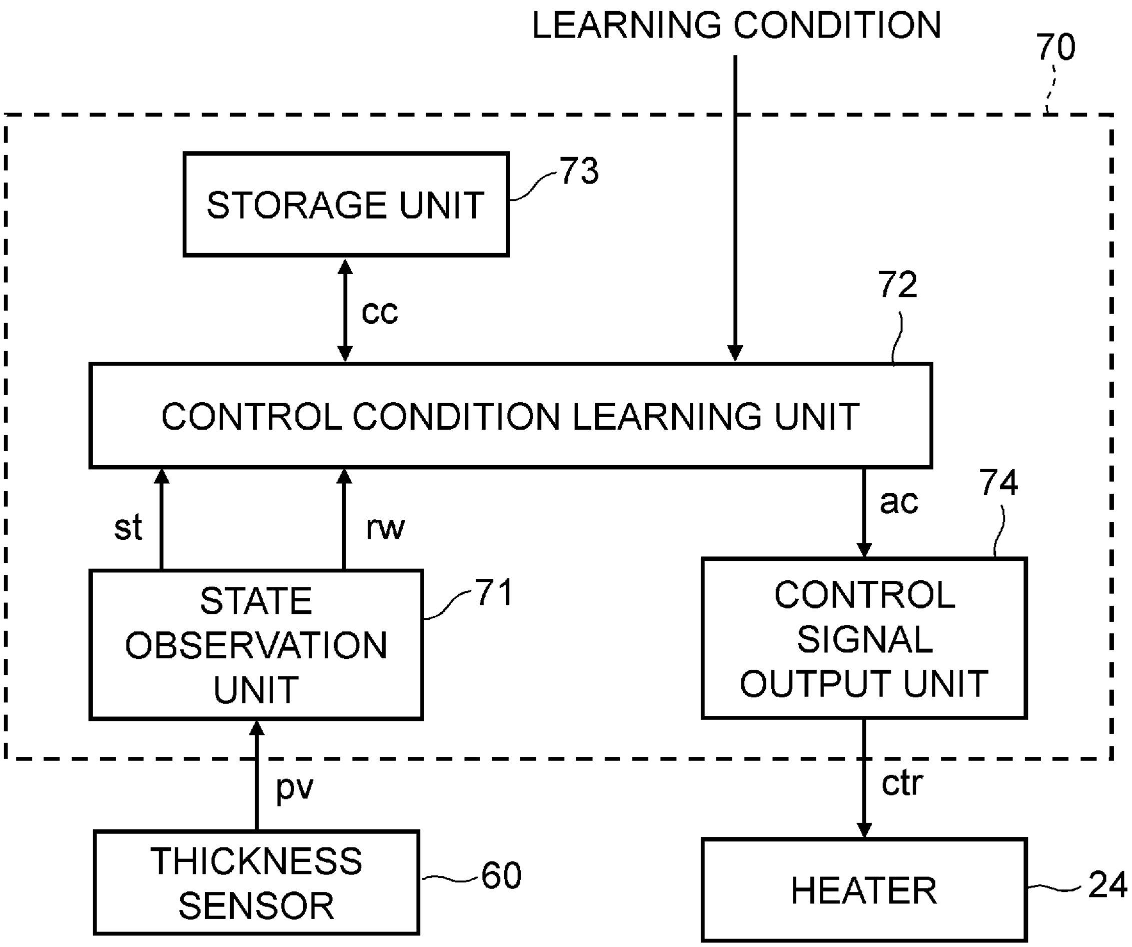
FIG. 4 is a block diagram showing a configuration of a control unit 70 according to the first embodiment.

Next, the configuration of the control unit 70 according to the first embodiment will be described in a more detailed manner with reference to FIG. 4. FIG. 4 is a block diagram showing the configuration of the control unit 70 according to the first embodiment. As shown in FIG. 4, the control unit 70 according to the first embodiment includes a state observation unit 71, a control condition learning unit 72, a storage unit 73, and a control signal output unit 74.

Note that each of the functional blocks constituting the control unit 70 can be implemented by hardware such as a CPU (Central Processing Unit), a memory, and other circuits, or can be implemented by software such as a program (s) loaded in a memory or the like. Therefore, each functional block can be implemented in various forms by computer hardware, software, or combinations thereof.

The state observation unit 71 calculates a control error of each heat bolt HB from a measured value pv of the thickness distribution of the resin film 83 acquired from the thickness sensor 60. The control error is a difference between a target value and a measured value pv. Note that the target value is an average value of measured values pv of the thickness distribution of the resin film 83 measured in all the heat bolts HB by the thickness sensor 60.

Note that when the average value of measured values pv is obtained, measured values measured at both ends of the resin film 83, which are not used as a product, may be excluded from those used to obtain the average value.

Meanwhile, the measured value pv of each heat bolt HB is determined from a measured value pv of a thickness at a measuring point assigned to that heat bolt HB. For example, the measured value pv of each heat bolt HB is an average value of measured values pv of a thickness at a measuring point assigned to that heat bolt HB. Alternatively, at a measurement point assigned to each heat bolt HB, a measured value pv of a thickness of which the difference from the target value is the largest may be used as the measured value pv of that heat bolt HB.

Further, the state observation unit 71 determines, for each heat bolt HB, a current state st and a reward rw for an action ac selected in the past (e.g., selected in the last time) based on the calculated control error.

The state st is defined in advance in order to classify values of the control error, which can take any of infinite number of values, into a finite number of groups. As a simple example for an explanatory purpose, when the control error is represented by err, for example, a range "$-0.9\ \mu m \le err < -0.6\ \mu m$" is defined as a state st1; a range "$-0.6\ \mu m \le err < -0.3\ \mu m$" is defined as a state st2; a range "$-0.3\ \mu m \le err < 0.3\ \mu m$" is defined as a state st3; a range "$0.3\ \mu m < err < 0.6\ \mu m$" is defined as a state st4; and a range "$0.6\ \mu m \le err < 0.9\ \mu m$" is defined as a state st5. In practice, in many cases, a larger number of states st each having a narrower range may be defined.

The reward rw is an index for evaluating an action ac that was selected in a past state st.

Specifically, when the absolute value of the calculated current control error is smaller than the absolute value of the past control error, the state observation unit 71 determines that the action ac selected in the past is appropriate and sets, for example, a positive value to the reward rw. In other words, the reward rw is determined so that the previously selected action ac is more likely to be selected again in the same state st as the past state.

On the other hand, when the absolute value of the calculated current control error is larger than the absolute value of the past control error, the state observation unit 71 determines that the action ac selected in the past is inappropriate and sets, for example, a negative value to the reward rw. In other words, the reward rw is determined so that the previously selected action ac is less likely to be selected again in the same state st as the past state.

Note that specific examples of the reward rw will be described later. Further, the value of the reward rw can be determined as appropriate. For example, the reward rw may have a positive value at all times, or the reward rw may have a negative value at all times.

The control condition learning unit 72 performs reinforcement learning in regard to each heat bolt HB. Specifically, the control condition learning unit 72 updates a control condition (a learning result) based on the reward rw, and selects an optimum action ac corresponding to the current state st under the updated control condition. The control condition is a combination of a state st and an action ac. Table 1 shows simple control conditions (learning results) corresponding to the above-described states st1 to st5. In the example shown in FIG. 4, the control condition learning unit 72 stores the updated control condition cc in the storage unit 73, which is, for example, a memory, and updates the control condition cc by reading it from the storage unit 73.

TABLE 1

| | st1 −0.9 to −0.6 μm | st2 −0.6 to −0.3 μm | st3 −0.3 to +0.3 μm | st4 +0.3 to +0.6 μm | st5 +0.6 to +0.9 μm |
|---|---|---|---|---|---|
| ac1 −1% | +4.2 | +5.3 | +3.4 | −1.2 | −3.2 |
| ac2 0% | −1.3 | +4.3 | +3.6 | +0.1 | −1.2 |
| ac3 +1% | −5.2 | +1.0 | +4.2 | +5.4 | +7.4 |
| ac4 +1.5% | −10.2 | −6.5 | −1.0 | +5.6 | +9.7 |

The Table 1 shows control conditions (learning results) by Q learning, which is an example of the reinforcement learning. The aforementioned five states st1 to st5 are shown in the uppermost row in the Table 1. That is, the five states st1 to st5 are shown in the second to sixth columns, respectively. Meanwhile, four actions ac1 to ac4 are shown in the leftmost column in the Table 1. That is, the four actions ac1 to ac4 are shown in the second to fifth rows, respectively.

Note that, in the example shown in the Table 1, an action for reducing the output (e.g., the voltage) to the heater 24 by 1% is defined as the action ac1 (Output Change: −1%). An action for maintaining the output to the heater 24 is defined as the action ac2 (Output Change: 0%). An action for increasing the output to the heater 24 by 1% is defined as the action ac3 (Output Change: +1%). An action for increasing the output to the heater 24 by 1.5% is defined as the action ac4 (Output Change: +1.5%). The example shown in the Table 1 is merely a simple example for an explanatory purpose. That is, in practice, in many cases, a larger number of more detailed actions ac may be defined.

A value determined by a combination of a state st and an action ac in the Table 1 is called a quality Q (st, ac). After an initial value is given, the quality Q is successively updated based on the reward rw by using a known updating formula. The initial value of the quality Q is included in, for example, the learning condition shown in FIG. 4. The learning condition is input by, for example, an operator. The initial value of the quality Q may be stored in the storage unit 73, and for example, a learning result in the past may be used as the initial value. Further, for example, the states st1 to st5 and the actions ac1 to ac4 shown in the Table 1 are included in the learning condition shown in FIG. 4.

The quality Q will be described by using the state st4 in the Table 1 as an example. In the state st4, since the control error is no smaller than 0.3 μm and smaller than 0.6 μm, the lip gap in the place corresponding to the target heat bolt HB is too wide. Therefore, it is necessary to increase the output to the heater 24 that heats the target heat bolt HB and thereby to increase the thermal expansion amount of the target heat bolt HB. Therefore, as a result of the learning by the control condition learning unit 72, the qualities Q of the actions ac3 and ac4 for increasing the output to the heater 24 are larger. Meanwhile, the qualities Q of the action ac2 for maintaining the output to the heater 24 and the action ac1 for reducing the output to the heater 24 are small.

In the example shown in the Table 1, for example, when the control error is 0.4 μm, the state st falls in the state st4. Therefore, the control condition learning unit 72 selects the optimum action ac4 having the maximum quality Q in the state st4, and outputs the selected action ac4 to the control signal output unit 74.

The control signal output unit 74 increases a control signal ctr output to the heater 24 by 1.5% based on the action ac4 received from the control condition learning unit 72. The control signal ctr is, for example, a voltage signal.

Then, when the absolute value of the next control error is smaller than the absolute value 0.4 μm of the current control error, the state observation unit 71 determines that the selecting of the action ac4 in the current state st4 is appropriate, and outputs a reward rw having a positive value. Therefore, the control condition learning unit 72 updates the control condition so as to increase the quality +5.6 of the action ac4 in the state st4 according to the reward rw. As a result, in the case of the state st4, the control condition learning unit 72 continuously selects the action ac4.

On the other hand, when the absolute value of the next control error is larger than the absolute value 0.4 μm of the current control error, the state observation unit 71 determines that the selecting of the action ac4 in the current state st4 is inappropriate, and outputs a reward rw having a negative value. Therefore, the control condition learning unit 72 updates the control condition so as to reduce the quality +5.6 of the action ac4 in the state st4 according to the reward rw. As a result, in the case of the state st4, when the quality of the action ac4 in the state st4 becomes smaller than the quality +5.4 of the action ac3, the control condition learning unit 72 selects the action ac3 instead of the action ac4.

Note that the timing of the updating of the control condition is not limited to the next time (e.g., not limited to when the control error is calculated the next time). That is, the timing of the updating may be determined as appropriate while taking a time lag or the like into consideration. Further, in the initial stage of the learning, the action ac may be randomly selected in order to expedite the learning. Further, although the reinforcement learning by simple Q learning is described above with reference to the Table 1, there are various types of learning algorithms such as Q learning, AC (Actor-Critic) method, TD learning, and Monte Carlo method, and the learning algorithm is not limited to in any type of algorithms. For example, when the number of states st and actions ac increase and the number of combinations thereof explosively increases, the algorithm may be selected, such as using the AC method, according to the situation.

Further, in the AC method, a probability distribution function is used as a policy function in many cases. The probability distribution function is not limited to the normal distribution function. For example, for the purpose of simplification, a sigmoid function, a soft max function, or the like may be used. The sigmoid function is a function that is used most commonly in neural networks. Because the reinforcement learning is one of the types of the machine learning that is the same as the neural network, it can use the sigmoid function. Further, the sigmoid function has another advantage that the function itself is simple and easily handled.

As described above, there are various learning algorithms and functions to be used, and an optimum algorithm and an optimum function may be selected as appropriate for the process.

As described above, the PID control is not used in the resin-film manufacturing apparatus according to the first embodiment. Therefore, to begin with, there is no need to adjust a parameter(s) which would otherwise be necessary when a process condition is changed. Further, the control unit 70 updates the control condition (the learning result) based on the reward rw through the reinforcement learning, and selects an optimum action ac corresponding to the current state st under the updated control condition. Therefore, even when a process condition(s) is changed, it is possible to reduce the time taken for the adjustment and the amount of a resin material required therefor.

<Control Method for Resin-Film Manufacturing Apparatus>

Figure 5:
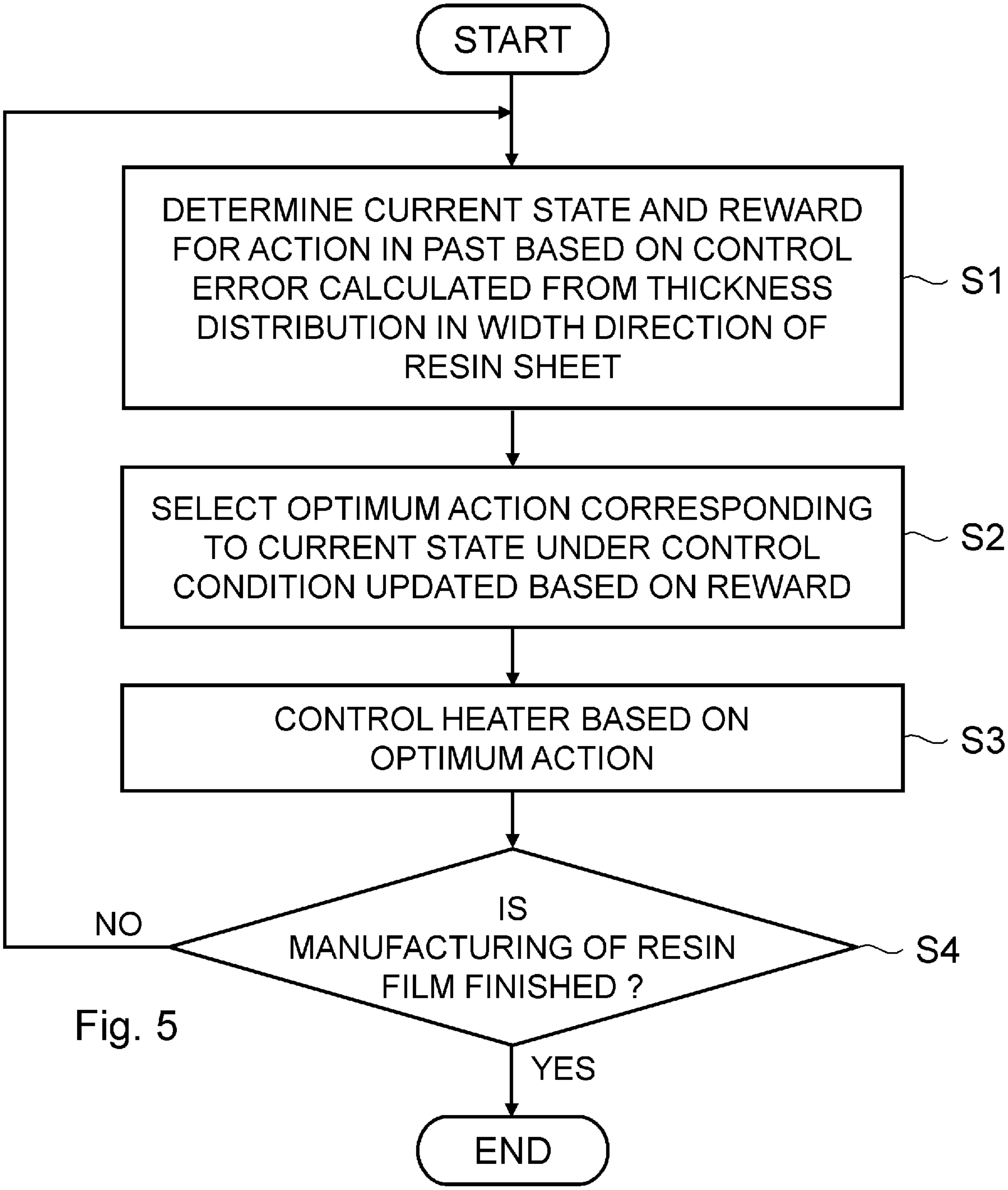
FIG. 5 is a flowchart showing a method for controlling a resin-film manufacturing apparatus according to the first embodiment.

Next, a method for controlling the resin-film manufacturing apparatus according to the first embodiment will be described in detail with reference to FIG. 5. FIG. 5 is a flowchart showing a method for controlling the resin-film manufacturing apparatus according to the first embodiment. The following description will be given while referring to FIG. 4 as appropriate as well as referring to FIG. 5.

Firstly, as shown in FIG. 5, the state observation unit 71 of the control unit 70 shown in FIG. 4 calculates, for each heat bolt HB, a control error from the thickness distribution of the resin film 83. Then, based on the calculated control error, the state observation unit 71 determines a current state st and a reward rw for an action ac selected in the past (Step S1). Note that, at the start of the control, since there is no action ac selected in the past (e.g., no action ac selected in the last control) and hence it is impossible to determine the reward rw. Therefore, only the current state st at the start of the control is determined.

Next, the control condition learning unit 72 of the control unit 70 updates a control condition, which is a combination of a state st and an action ac, based on the reward rw. Then, the control condition learning unit 72 selects an optimum action ac corresponding to the current state st under the updated control condition (Step S2). Note that, at the start of the control, the control condition is not updated and remains as the initial value, but the optimum action ac corresponding to the state st at the start of the control is selected.

Then, the control signal output unit 74 of the control unit 70 outputs a control signal ctr to the heater 24 based on the optimum action ac selected by the control condition learning unit 72 (Step S3).

When the manufacturing of the resin film 83 has not been completed yet (Step S4 No), the process returns to the step S1 and the control is continued. On the other hand, when the manufacturing of the resin film 83 has been completed (Step S4 YES), the control is finished. That is, the steps S1 to S3 are repeated until the manufacturing of the resin film 83 is completed.

As described above, the PID control is not used in the resin-film manufacturing apparatus according to the first embodiment. Therefore, to begin with, there is no need to adjust a parameter(s) which would otherwise be necessary when a process condition is changed. Further, the control condition (the learning result) is updated based on the reward rw through the reinforcement learning using a computer, and an optimum action ac corresponding to the current state st is selected under the updated control condition. Therefore, even when a process condition(s) is changed, it is possible to reduce the time taken for the adjustment and the amount of the resin material required therefor.

Note that the reinforcement learning performed by the control unit 70 is not indispensable. That is, as shown in FIG. 1, all that needs to be performed by the control unit 70 is to individually feedback-control the heater 24 of each of heat bolts HB so that the distribution of thicknesses of the resin film 83 acquired from the thickness sensor 60 is made uniform.

<Method for Determining Assignment Range of Each Heat Bolt in Distribution of Thicknesses According to Comparative Example>

Figure 6:
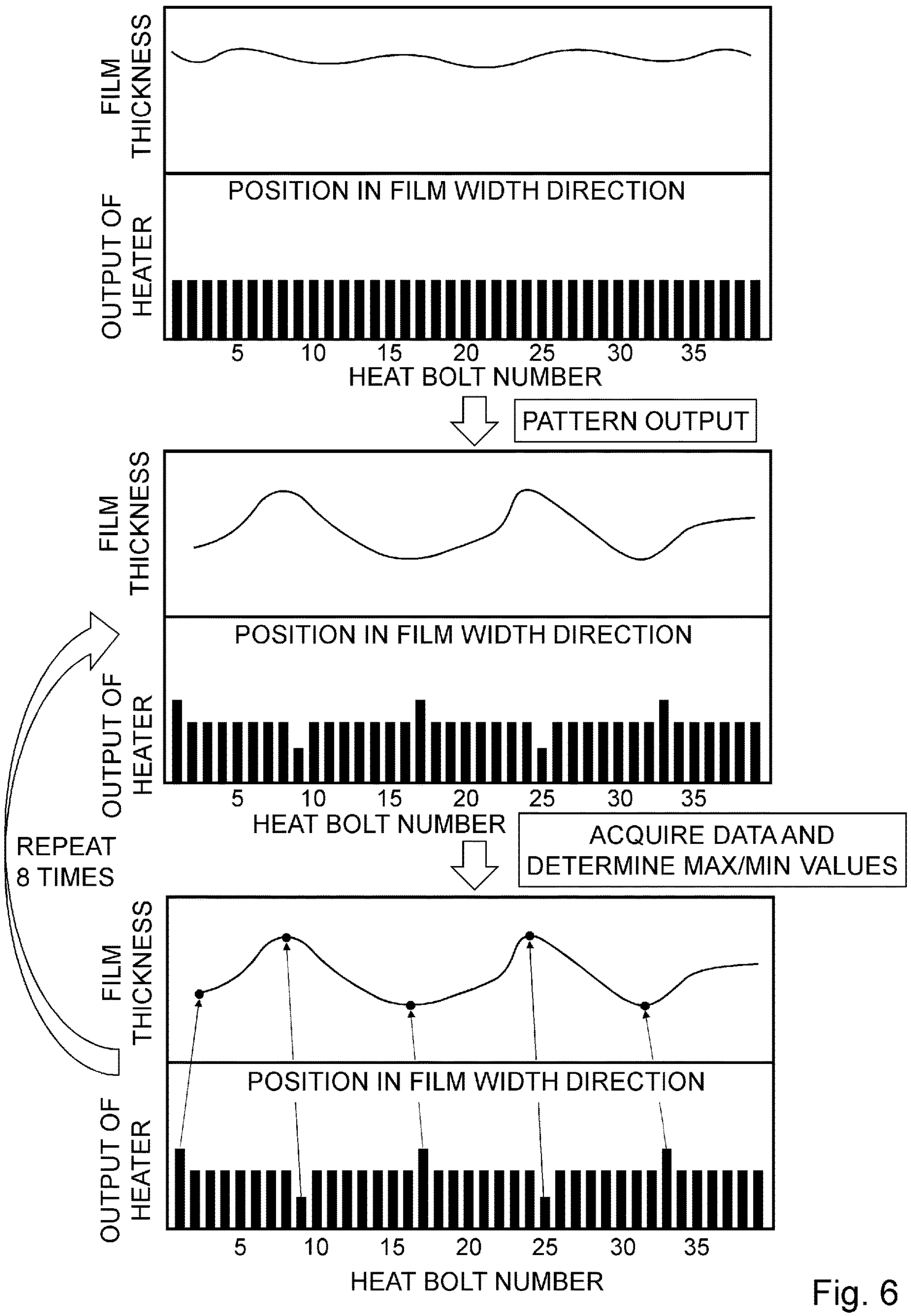
FIG. 6 is a schematic flowchart showing a method for determining an assignment range of each heat bolt in a distribution of thicknesses of a resin film according to a comparative example.

Next, a method for determining an assignment range of each heat bolt HB in a distribution of thicknesses of a resin film 83 according to a comparative example will be described with reference to FIG. 6. FIG. 6 is a schematic flowchart showing a method for determining an assignment range of each heat bolt in a distribution of thicknesses of a resin film according to the comparative example.

Each of graphs in upper, middle, and lower parts in FIG. 6 is a graph schematically showing a relationship between outputs of heaters 24 of respective heat bolts HB and the film thickness of a resin film 83. In each graph, the horizontal axis indicates heat bolt numbers and positions in the width direction of the resin film 83 corresponding to the heat bolt numbers.

In the comparative example shown in FIG. 6, as just an example, the T-die 20 shown in FIG. 3 includes 39 heat bolts HB for adjusting the lip gap.

Firstly, as shown in the upper part of FIG. 6, the outputs of all the heaters are set to the same value (e.g., 50%).

Next, as shown in the middle part of FIG. 6, the outputs of the heaters are changed to such a pattern that they are alternately raised or lowered at intervals of eight heaters of heat bolts HB (i.e., one heater in every eight heaters is alternately raised or lowered). In the example shown in the middle part of FIG. 6, the outputs of the heaters of the first, 17th, and 33rd heat bolts HB are raised, and the outputs of the heaters of the 9th and 25th heat bolts HB are lowered.

Note that in order to prevent heat bolts HB from being affected by adjacent heat bolts HB, the outputs of the heaters are performed at intervals of eight heaters (i.e., one heater in every eight heaters). The intervals of eight heaters are merely an example. However, the smaller the number of intervals is, the more likely they are affected by adjacent heat bolts HB. On the other hand, the larger the number of intervals is, the more the time required to determine assignment ranges and the amount of required resin material increase.

Next, as shown in the lower part of FIG. 6, data on the thickness of the resin film 83 is acquired. Then, measurement points at which the outputs have the minimum values are defined as the central position in the assignment ranges of the first, 17th, and 33rd heat bolts HB. Further, measurement points at which the outputs have the maximum values are defined as the central position in the assignment ranges of the 9th and 25th heat bolts HB.

Next, as shown in FIG. 6, referring to the middle part of FIG. 6 again, the outputs of the heaters of heat bolts HB different from those in the previous round are alternately raised or lowered at intervals of eight heaters (i.e., one heater in every eight heaters is alternately raised or lowered). Specifically, the outputs of the heaters shifted from those in the previous round by one, i.e., the heaters of the second, 18th, and 34th heat bolts HB, are raised, and the outputs of the heaters of the 10th and 26th heat bolts HB are lowered.

Next, as shown in the lower part of FIG. 6, data on the thickness of the film is acquired. Then, measurement points at which the outputs have the minimum values are defined as the central position in the assignment ranges of the second, 18th, and 34th heat bolts HB. Further, measurement points at which the outputs have the maximum values are defined as the central position in the assignment ranges of the 10th and 26th heat bolts HB.

As described above, the outputs of the heaters of the heat bolts HB are raised or lowered at intervals of eight heaters. Therefore, as shown in FIG. 6, the processes shown in the middle and lower parts of FIG. 6 are repeated eight times and the central positions of the assignment ranges of all the heat bolts HB are thereby determined. Then, for example, the center between the central positions of the assignment ranges of the heat bolts HB adjacent to each other is defined as a boundary line between these assignment ranges.

Through the above-described series of processes, the assignment range of each of the heat bolts HB is determined.

The method for determining the assignment range of each heat bolt HB according to the comparative example needs to be performed before a resin film 83 is manufactured, and hence cannot be performed simultaneously with the feed-back control for manufacturing the resin film 83. Therefore, the method for determining the assignment range of each heat bolt HB according to the comparative example requires a long time and wastes a large amount of resin material.

<Method for Determining Assignment Range of Each Heat Bolt in Distribution of Thicknesses According to First Embodiment>

Figure 7:
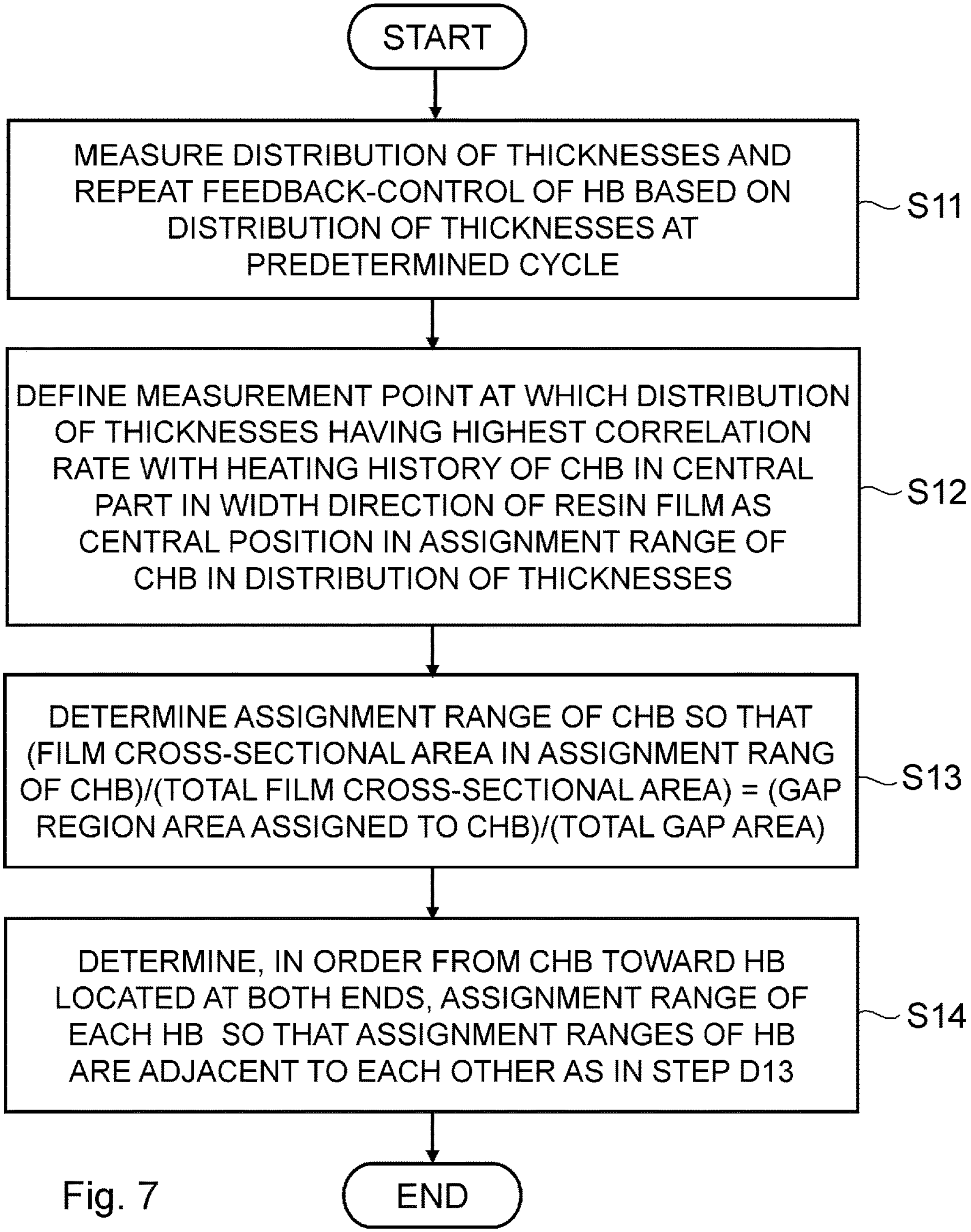
FIG. 7 is a flowchart showing a method for determining an assignment range of each heat bolt in a distribution of thicknesses of a resin film according to the first embodiment.

Next, a method for determining ah assignment range of each heat bolt HB in a distribution of thicknesses of a resin film 83 according to this embodiment will be described with reference to FIG. 7. FIG. 7 is a flowchart showing a method for determining an assignment range of each heat bolt in a distribution of thicknesses of a resin film according to a first embodiment.

Note that in FIG. 7, a heat bolt is represented by HB and a central heat bolt is represented by CHB.

Firstly, as shown in FIG. 7, when the manufacturing of a resin film 83 is started, a distribution of thicknesses is measured and feedback-control of each heat bolt HB (i.e., each heater 24) for making the distribution of thicknesses uniform is repeated a predetermined number of cycles (Step S11). The number of cycles is not limited in any particular number, but is, for example, about several tens of times.

Note that the initial value of the assignment range of each heat bolt HB in the distribution of thicknesses of the resin film 83 can be determined by, for example, a known geo-metrical technique or the like in which the neck-in effect of the resin film 83 is taken into consideration.

Next, as shown in FIG. 7, a measurement point at which the distribution of thicknesses having the highest correlation rate with the heating history of the central heat bolt CHB in the central part in the width direction of the resin film 83 is defined as a central position in the assignment range of the central heat bolt CHB in the distribution of thicknesses (Step S12). That is, the central position in the assignment range of the central heat bolt CHB is determined based on the distribution of thicknesses at each cycle obtained in the step S11 and the heating history of the central heat bolt CHB.

Note that as just an example, the interval between mea-surement points of the distribution of thicknesses is 1 mm.

Figure 8:
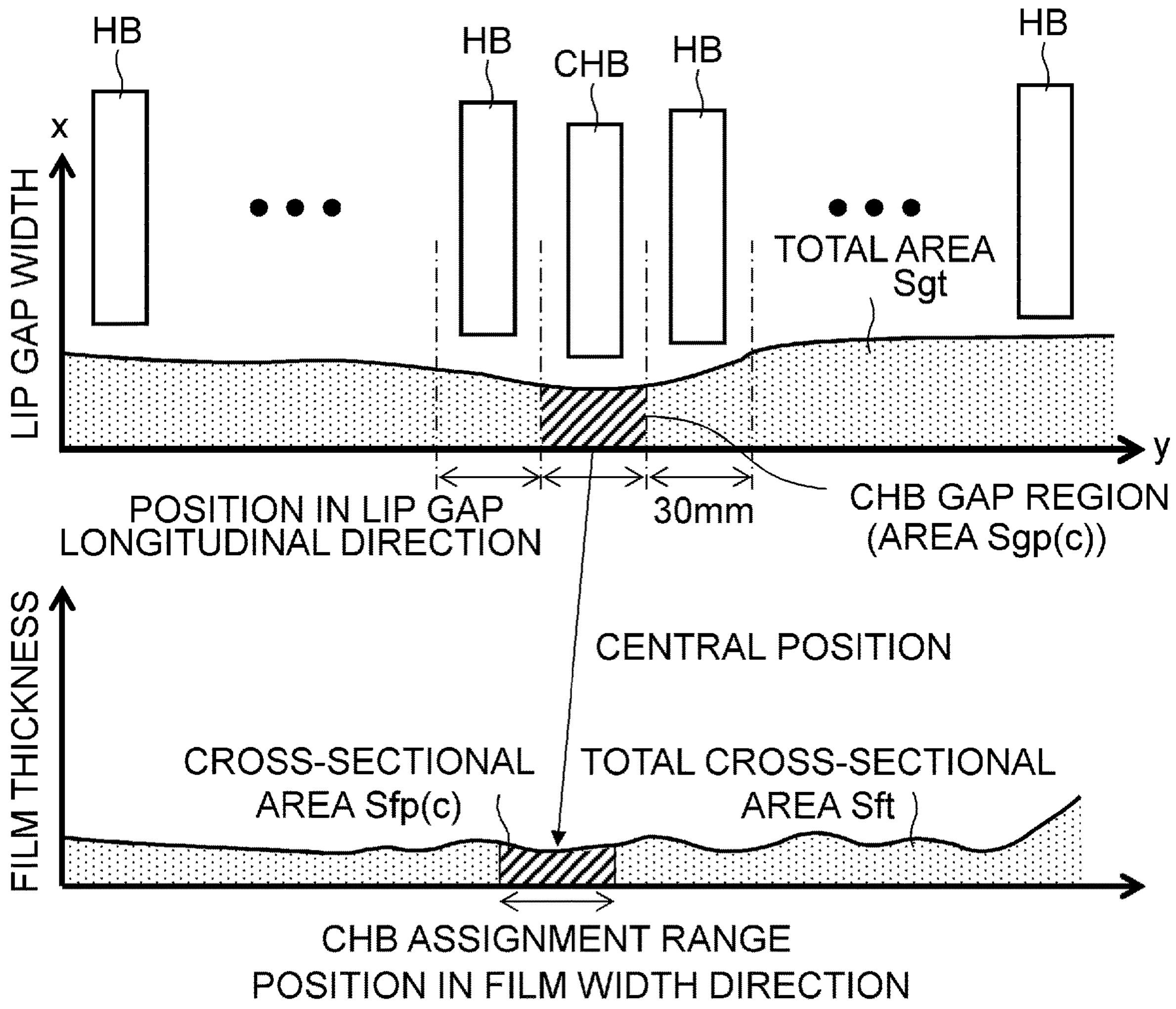
FIG. 8 is a conceptual diagram for explaining a step S13 shown in FIG. 7.

A next step S13 will be described with reference to FIG. 8. FIG. 8 is a conceptual diagram schematically showing the step S13 in FIG. 7. An upper part of FIG. 8 is a schematic graph showing a relationship between heat bolts HB and the lip gap. The horizontal axis of this graph indicates the position of the lip gap in the longitudinal direction (x-axis in FIG. 3), and the vertical axis indicates the width of the lip gap (y-axis in FIG. 3). A lower part of FIG. 8 is a graph showing the distribution of thicknesses of the resin film 83. The horizontal axis of this graph indicates the position in the film width direction, and the vertical axis indicates the film thickness.

Note that the volume of resin assigned to each heat bolt HB is maintained.

Therefore, the ratio of the cross-sectional area Sfp(i) of the resin film 83 in the assignment range of each heat bolt HB to the total cross-sectional area Sft of the resin film 83 shown in the lower part of FIG. 8 is equal to the ratio of the area Sgp(i) of the gap region assigned to each heat bolt HB to the total lip gap area Sgt shown in the upper part of FIG. 8. Here, i represents a number assigned to a heat bolt HB, and the number assigned to the central heat bolt CHB is c (i=c).

Therefore, as shown in the step S13 in FIG. 7, the below-shown equation also holds for the central heat bolt CHB.

$$(\text{Resin film cross-sectional area } Sfp(c) \text{ in assignment range of } CHB)/(\text{Total resin film cross-sectional area } Sft) = (\text{Gap region area } Sgp(c) \text{ assigned to } CHB)/(\text{Total lip gap area } Sgt)$$

By using this relationship, the assignment range of the central heat bolt CHB is determined from the central posi-tion determined in the step S12 (Step S13). That is, after the central position in the assignment range of the central heat bolt CHB is determined in the step S12, the assignment range is determined in the step S13.

The step S13 will be described in a more detailed manner with reference to FIG. 8.

The total cross-sectional area Sft of the resin film 83 that is used when the assignment range of the central heat bolt CHB is determined is obtained from the distribution of thicknesses at that time. Specifically, as shown in the graph in the lower part of FIG. 8, the total cross-sectional area Sft of the resin film 83 is an integral value of the measured film thickness over the entire film width, and is indicated by dots.

Further, the total lip gap area Sgt that is used when the assignment range of the central heat bolt CHB is determined is an integral value of the width of the lip gap over the entre lip gag longitudinal direction in the graph shown in the upper part of FIG. 8, and is indicated by dots. It is difficult to measure the lip gap that is used when the assignment range of the central heat bolt CHB shown in the graph in the upper part of FIG. 8 is determined, so that it is predicted from, for example, the initial value of the lip gap and the heating history of each heat bolt HB (output history of each heater 24).

Note that it is possible to acquire the initial value of the lip gap by measuring the lip gap in a state in which all the heaters 24 have the same output (e.g., 50%) before the film-shaped molten resin 82*a* passes through the lip gap, i.e., before the manufacturing of the resin film 83 is started.

Alternatively, the distribution of thicknesses of the resin film 83 may be measured in a state in which all the heaters 24 have the same output (e.g., 50%) before the manufacturing of the resin film 83 is started, and the initial value of the lip gap may be calculated from this distribution of thicknesses.

As shown in the graph in the upper part of FIG. 8, the gap region assigned to the central heat bolt CHB (CHB gap region in the upper part of FIG. 8) is a region interposed between dashed lines, located at the center between adjacent heat bolts HB in the lip gap. This gap region is indicated by hatching in the graph in the upper part of FIG. 8.

The length of the gap region of each heat bolt HB (the length in the horizontal axis in the graph shown in the upper part of FIG. 8) is geometrically assigned (i.e., determined), so that it does not change by the heating of the heat bolt HB.

Note that when the heat bolts HB are evenly spaced from each other, the lengths of the gap regions of the heat bolts HB are equal to each other. In the graph shown in the upper part of FIG. 8, as just an example, the interval between heat bolts HB, i.e., the length of the gap region, is 30 mm.

In contrast, the width of the gap region of the central heat bolt CHB in the vertical axis of the graph shown in the upper part of FIG. 8 could change by the heating of the central heat bolt CHB and the heating of a heat bolt(s) HB in the vicinity thereof.

The area Sgp(c) of the gap region that is used when the assignment range of the central heat bolt CHB is determined is an integral value of the width of the lip gap over the gap region section shown in the graph shown in the upper part of FIG. 8. As described above, it is difficult to measure the lip gap that is used when the assignment range of the central heat bolt CHB shown in the graph in the upper part of FIG. 8 is determined. Therefore, similarly to the total lip gap area Sgt, the area Sgp(c) of the gap region is predicted from, for example, the initial value of the lip gap and the output history of each heater 24 (heating history of each heat bolt HB).

As described above, the total cross-sectional area Sft of the resin film, the total lip gap area Sgt, and the gap region Sgp(c) of the central heat bolt CHB are known. Therefore, the cross-sectional area Sfp(c) of the resin film in the assignment range of the central heat bolt CHB is obtained from, for example, the equation shown in the step S13. The assignment range of the central heat bolt CHB is the section over which the obtained cross-sectional area Sfp(c) of the resin film is integrated. Further, since the median value (the central position in the assignment range) in the aforementioned integral section is known in the step S12, the assignment range of the central heat bolt CHB can be obtained.

Next, referring to FIG. 7 again, a step S14 will be described.

As shown in FIG. 7, after the step S13 in which the assignment range of the central heat bolt CHB has been determined, the assignment ranges of the other heat bolts HB are determined. Specifically, in order from the central heat bolt CHB toward the heat bolts HB located at both ends, the assignment ranges of the heat bolts HB are determined so that the assignment ranges of the heat bolts HB are adjacent to each other (i.e., so that the assignment ranges of the heat bolts HB abut on each other) (Step S14).

Note that similarly to the central heat bolt CHB shown in the step S13, the below-shown equation holds for each of the heat bolts HB.

$$(\text{Resin film cross-sectional area } Sfp(i) \text{ in assignment range of each } HB)/(\text{Total resin film cross-sectional area } Sft) = (\text{Gap region area } Sgp(i) \text{ assigned to each } HB)/(\text{Total lip gap area } Sgt)$$

By using this relationship, it is possible to successively determine assignment ranges of adjacent heat bolts HB from the assignment range of the central heat bolt CHB obtained in the step S13.

As described above, in the resin-film manufacturing apparatus according to this embodiment, when manufacturing of a resin film is started, a distribution of thicknesses is measured by the thickness sensor and feedback-control of a plurality of heat bolts HB for making the distribution of thicknesses uniform is repeated a predetermined number of cycles. Next, a measurement point at which the distribution of thicknesses having the highest correlation rate with the heating history of the central heat bolt among the plurality of heat bolts in the central part in the width direction of the resin film is defined as a central position in the assignment range assigned to the central heat bolt in the distribution of thicknesses. Then, the assignment range is determined from the central position of the central heat bolt so that an area ratio of a gap region assigned to the central heat bolt to the whole lip gap becomes equal to a ratio of a cross-sectional area of the resin film in the assignment range to the total cross-sectional area of the resin film.

Figure 9:
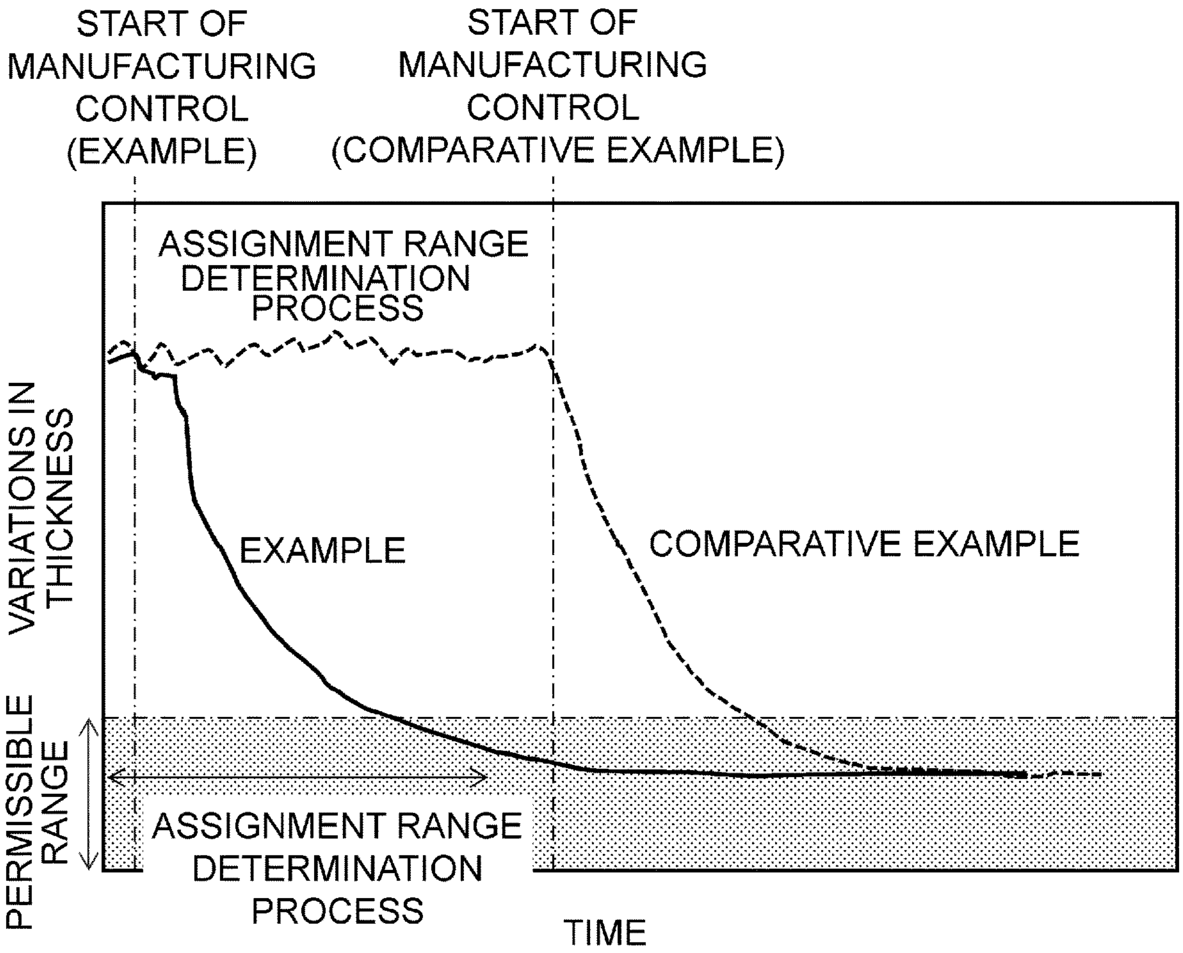
FIG. 9 is a graph schematically showing effects provided by the resin-film manufacturing apparatus according to the first embodiment.

Here, FIG. 9 is a graph schematically showing effects provided by the resin-film manufacturing apparatus according to the first embodiment. In FIG. 9, the horizontal axis indicates time, and the vertical axis indicates variations in the thickness of the resin film 83.

In FIG. 9, a comparative example in which an assignment range determination process shown in FIG. 6 is performed, and an example in which an assignment range determination process shown in FIG. 7 is performed are shown.

In the comparative example, it is necessary to perform the assignment range determination process shown in FIG. 6 before performing feedback-control for manufacturing a resin film. That is, in the comparative example, no resin film can be manufactured during the assignment range determination process. Therefore, as shown in FIG. 9, in the comparative example, the assignment range determination process requires a long time and wastes a large amount of resin material.

In contrast, in the embodiment, it is possible to perform the assignment range determination process while performing feedback-control for manufacturing a resin film (i.e., while manufacturing a resin film). Therefore, as shown in FIG. 9, in the embodiment, the time and the resin material required for the assignment range determination process can be dramatically reduced compared with the comparative example. In the example shown in FIG. 9, variations in the thickness are within a permissible range during the assignment range determination process.

Further, in the embodiment, since it is possible to perform the assignment range determination process while manufacturing a resin film, it is possible to repeat the assignment range determination process a plurality of times while manufacturing the resin film. By repeating the assignment range determination process a plurality of times, the assignment ranges can be changed to more appropriate ones during the manufacturing of the resin film. Note that in the comparative example, since it is not possible to perform the assignment range determination process while manufacturing a resin film, it is not possible to change the assignment ranges to more appropriate ones during the manufacturing of the resin film.

Second Embodiment

Next, a resin-film manufacturing apparatus according to a second embodiment will be described with reference to FIG. 10. An overall configuration of the resin-film manufacturing apparatus according to the second embodiment is similar to that of the resin-film manufacturing apparatus according to the first embodiment shown in FIGS. 1 to 3, and therefore the description thereof will be omitted. The configuration of the control unit 70 of the resin-film manufacturing apparatus according to the second embodiment is different from that of the resin-film manufacturing apparatus according to the first embodiment.

Figure 10:
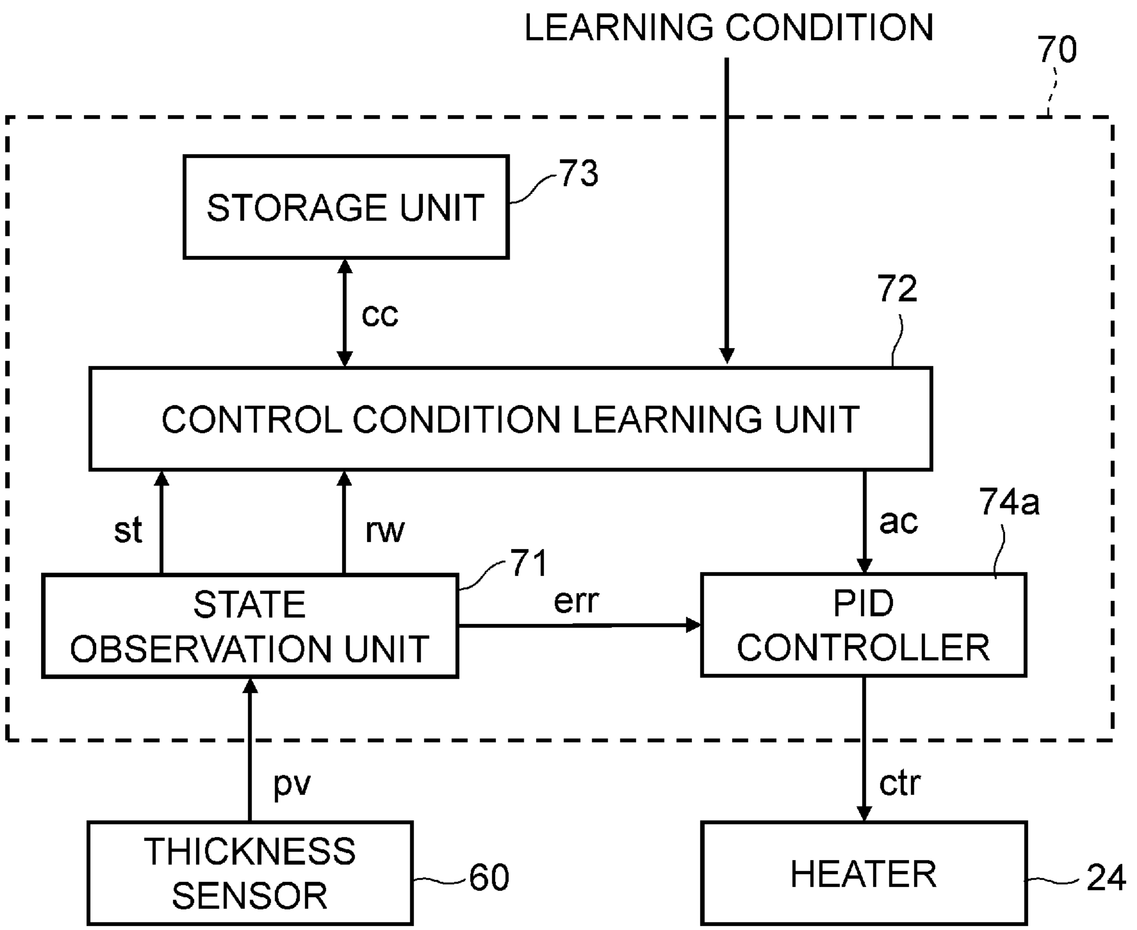
FIG. 10 is a block diagram showing a configuration of a control unit 70 according to a second embodiment.

FIG. 10 is a block diagram showing the configuration of the control unit 70 according to the second embodiment. As shown in FIG. 10, the control unit 70 according to the second embodiment includes a state observation unit 71, a control condition learning unit 72, a storage unit 73, and a PID controller 74*a*. That is, the control unit 70 according to the second embodiment includes the PID controller 74*a* as the control signal output unit 74 in the control unit 70 according to the first embodiment shown in FIG. 4. The PID controller 74*a* is also an example of the control signal output unit.

Similarly to the first embodiment, the state observation unit 71 determines, for each heat bolt HB, a current state st and a reward rw for an action ac selected in the past based on the calculated control error err. Then, the state observation unit 71 outputs the current state st and the reward rw to the control condition learning unit 72. Further, the state observation unit 71 according to the second embodiment outputs the calculated control error err to the PID controller 74*a*.

Similarly to the first embodiment, the control condition learning unit 72 also performs reinforcement learning for each heat bolt HB. Specifically, the control condition learning unit 72 updates a control condition (a learning result) based on the reward rw, and selects an optimum action ac corresponding to the current state st under the updated control condition. Note that, in the first embodiment, the output to the heater 24 is directly changed according to the content (i.e., the details) of the action ac selected by the control condition learning unit 72. In contrast, in the second embodiment, a parameter(s) of the PID controller 74*a* is changed according to the content (e.g., the details) of the action ac selected by the control condition learning unit 72.

As shown in FIG. 10, the parameter of the PID controller 74*a* is successively changed based on the action ac output from the control condition learning unit 72. Meanwhile, the PID controller 74*a* outputs a control signal ctr to the heater 24 based on the control error err received from the control condition learning unit 72. The control signal ctr is, for example, a voltage signal.

The rest of the configuration is similar to that of the first embodiment, and therefore the description thereof will be omitted.

As described above, in the resin-film manufacturing apparatus according to the second embodiment, PID control is used, so that it is necessary to adjust a parameter(s) when a process condition(s) is changed. In the resin-film manufacturing apparatus according to the second embodiment, the control unit 70 updates the control condition (the learning result) based on the reward rw through the reinforcement learning, and selects an optimum action ac corresponding to the current state st under the updated control condition. Note that the action ac in the reinforcement learning is to change a parameter of the PID controller 74*a*. Therefore, even when a process condition(s) is changed, it is possible to reduce the time taken for the adjustment of the parameter and the amount of a resin material required therefor.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A resin-film manufacturing apparatus comprising:

a die comprising a plurality of heat bolts arranged along a longitudinal direction of a pair of lips, and a plurality of heaters configured to heat the plurality of heat bolts, respectively, the die being configured so that a lip gap can be adjusted by each of the plurality of heat bolts;

a cooling roll configured to discharge a resin film while cooling molten resin extruded from the lip gap, the resin film being a film that is formed as the molten resin solidifies;

a thickness sensor configured to measure a distribution of thicknesses of the resin film discharged from the cooling roll in a width direction thereof; and a control unit configured to feedback-control each of the plurality of heaters so that the distribution of thicknesses measured by the thickness sensor is made uniform, wherein when manufacturing of the resin film is started, the control unit:

repeats the measurement of the distribution of thicknesses and the feedback-control of the plurality of heaters for making the distribution of thicknesses uniform a predetermined number of cycles;

defines a measurement point at which the distribution of thicknesses having a highest correlation rate with a heating history of a central heat bolt among the plurality of heat bolts in a central part in the width direction of the resin film as a central position in an assignment range assigned to the central heat bolt in the distribution of thicknesses; and determines the assignment range of the central heat bolt from the central position based on a relationship between an area ratio of a gap region assigned to the central heat bolt to a whole lip gap and a ratio of a cross-sectional area of the resin film in the assignment range to a total cross-sectional area of the resin film.

2. The resin-film manufacturing apparatus according to claim 1, wherein after determining the assignment range of the central heat bolt, the control unit determines assignment ranges of the plurality of heat bolts other than the central heat bolt so that the assignment ranges of the heat bolts are adjacent to each other in order from the central heat bolt toward the heat bolts located at both ends.

3. The resin-film manufacturing apparatus according to claim 1, wherein the control unit:

acquires the lip gap measured in a state in which all of the plurality of heaters have the same output before the manufacturing of the resin film is started; and predicts the lip gap that is used when the assignment range is determined by using the acquired lip gap as an initial value.

4. The resin-film manufacturing apparatus according to claim 1, wherein the control unit:

acquires the distribution of thicknesses of the resin film measured in a state in which all of the plurality of heaters have the same output before the manufacturing of the resin film is started, and predicts the lip gap that is used when the assignment range is determined by using the acquired lip gap determined based on the distribution of thicknesses of the resin film as an initial value.

5. The resin-film manufacturing apparatus according to claim 1, wherein the plurality of heat bolts are evenly spaced from each other.

6. The resin-film manufacturing apparatus according to claim 1, wherein only one of the pair of lips is connected to the plurality of heat bolts.

7. The resin-film manufacturing apparatus according to claim 1, wherein the thickness sensor is a noncontact-type sensor configured to measure the distribution of thicknesses of the resin film in the width direction thereof while being scanned in the width direction of the resin film.

8. A method for controlling a resin-film manufacturing apparatus, the resin-film manufacturing apparatus comprising:

a die comprising a plurality of heat bolts arranged along a longitudinal direction of a pair of lips, and a plurality of heaters configured to heat the plurality of heat bolts, respectively, the die being configured so that a lip gap can be adjusted by each of the plurality of heat bolts;

a cooling roll configured to discharge a resin film while cooling molten resin extruded from the lip gap, the resin film being a film that is formed as the molten resin solidifies; and a thickness sensor configured to measure a distribution of thicknesses of the resin film discharged from the cooling roll in a width direction thereof, the method comprising feedback-controlling each of the plurality of heaters so that the distribution of thicknesses measured by the thickness sensor is made uniform, wherein when manufacturing of the resin film is started, a computer performs the steps of:

(a) repeating the measurement of the distribution of thicknesses and the feedback-control of the plurality of heaters for making the distribution of thicknesses uniform a predetermined number of cycles;

(b) defining a measurement point at which the distribution of thicknesses having a highest correlation rate with a heating history of a central heat bolt among the plurality of heat bolts in a central part in the width direction of the resin film as a central position in an assignment range assigned to the central heat bolt in the distribution of thicknesses; and (c) determining the assignment range of the central heat bolt from the central position based on a relationship between an area ratio of a gap region assigned to the central heat bolt to a whole lip gap and a ratio of a cross-sectional area of the resin film in the assignment range to a total cross-sectional area of the resin film.

9. The method for controlling a resin-film manufacturing apparatus according to claim 8, further comprising: after the step (c), (d) determining assignment ranges of the plurality of heat bolts other than the central heat bolt so that the assignment ranges of the heat bolts are adjacent to each other in order from the central heat bolt toward the heat bolts located at both ends.

10. The method for controlling a resin-film manufacturing apparatus according to claim 8, wherein the lip gap measured in a state in which all of the plurality of heaters have the same output is acquired before the manufacturing of the resin film is started; and the lip gap that is used when the assignment range is determined in the step (c) is predicted by using the acquired lip gap as an initial value.

11. The method for controlling a resin-film manufacturing apparatus according to claim 8, wherein the distribution of thicknesses of the resin film measured in a state in which all of the plurality of heaters have the same output is acquired before the manufacturing of the resin film is started, and the lip gap that is used when the assignment range is determined in the step (c) is predicted by using the acquired lip gap determined based on the distribution of thicknesses of the resin film as an initial value.

12. The method for controlling a resin-film manufacturing apparatus according to claim 9, wherein the steps (a) to (d) are repeated a plurality of times.

13. The method for controlling a resin-film manufacturing apparatus according to claim 8, wherein the plurality of heat bolts are evenly spaced from each other.

14. The method for controlling a resin-film manufacturing apparatus according to claim 8, wherein only one of the pair of lips is connected to the plurality of heat bolts.

15. The method for controlling a resin-film manufacturing apparatus according to claim 8, wherein the thickness sensor is a noncontact-type sensor configured to measure the distribution of thicknesses of the resin film in the width direction thereof while being scanned in the width direction of the resin film.

* * * * *